(12) United States Patent
Landes et al.

(10) Patent No.: US 10,096,874 B2
(45) Date of Patent: Oct. 9, 2018

(54) ELECTRICAL ENERGY STORE

(71) Applicant: Siemens Aktiengesellschaft, Munich (DE)

(72) Inventors: Harald Landes, Ruckersdorf (DE); Carsten Schuh, Baldham (DE); Thomas Soller, Deggendorf (DE)

(73) Assignee: Siemens Aktiengesellschaft, Munich (DE)

( * ) Notice: Subject to any disclaimer, the term of this patent is extended or adjusted under 35 U.S.C. 154(b) by 237 days.

(21) Appl. No.: 14/410,977

(22) PCT Filed: May 23, 2013

(86) PCT No.: PCT/EP2013/060645
§ 371 (c)(1),
(2) Date: Dec. 23, 2014

(87) PCT Pub. No.: WO2014/000997
PCT Pub. Date: Jan. 3, 2014

(65) Prior Publication Data
US 2015/0325895 A1 Nov. 12, 2015

(30) Foreign Application Priority Data
Jun. 29, 2012 (DE) .................. 10 2012 211 325

(51) Int. Cl.
*H01M 2/20* (2006.01)
*H01M 2/24* (2006.01)
(Continued)

(52) U.S. Cl.
CPC ......... *H01M 12/08* (2013.01); *H01M 8/0256* (2013.01); *Y02E 60/128* (2013.01)

(58) Field of Classification Search
CPC ... H01M 8/0202; H01M 8/0269; H01M 2/266
See application file for complete search history.

(56) References Cited

U.S. PATENT DOCUMENTS 3,930,967 A 1/1976 Alder
2004/0053104 A1 3/2004 Novkov
(Continued)

FOREIGN PATENT DOCUMENTS

DE 19958405 A1 6/2001
DE 102009057720 A1 6/2011
(Continued)

OTHER PUBLICATIONS

Lee, Kevin C., Dependence of Contact Resistance on Current for Ohmic Contacts to Quantized Hall Resistors, IEEE Transactions on Instrumentation and Measurement, vol. 48, No. 2, Apr. 1999, pp. 319-323, US.

*Primary Examiner* — Olatunji A Godo
*Assistant Examiner* — Julian Anthony
(74) *Attorney, Agent, or Firm* — Beusse Wolter Sanks & Maire

(57) ABSTRACT

An electrical energy store is provided, including a storage cell, which in turn has an air electrode, which is connected to air channels in an air supply device, and a storage electrode, wherein the storage electrode adjoins a storage structure, wherein electrical contacts rest on the storage electrode, further wherein contact pins which protrude out of a surface of the storage structure are integrated in the storage structure, and the contact pins are in electrical contact with the storage electrode.

19 Claims, 4 Drawing Sheets

(51) Int. Cl.
*H01M 8/24* (2016.01)
*H01M 12/08* (2006.01)
*H01M 8/0256* (2016.01)

(56) References Cited

U.S. PATENT DOCUMENTS

2005/0019642 A1\* 1/2005 Hishitani ............ H01M 4/8621
429/465
2013/0034784 A1 2/2013 Landes et al.
2013/0183595 A1 7/2013 Greiner et al.

FOREIGN PATENT DOCUMENTS

| | | |
|---|---|---|
| DE | 102010041019 A1 | 3/2012 |
| EP | 1211742 A2 | 6/2002 |
| WO | 2005117192 A | 12/2005 |
| WO | 2005117192 A1 | 12/2005 |

\* cited by examiner

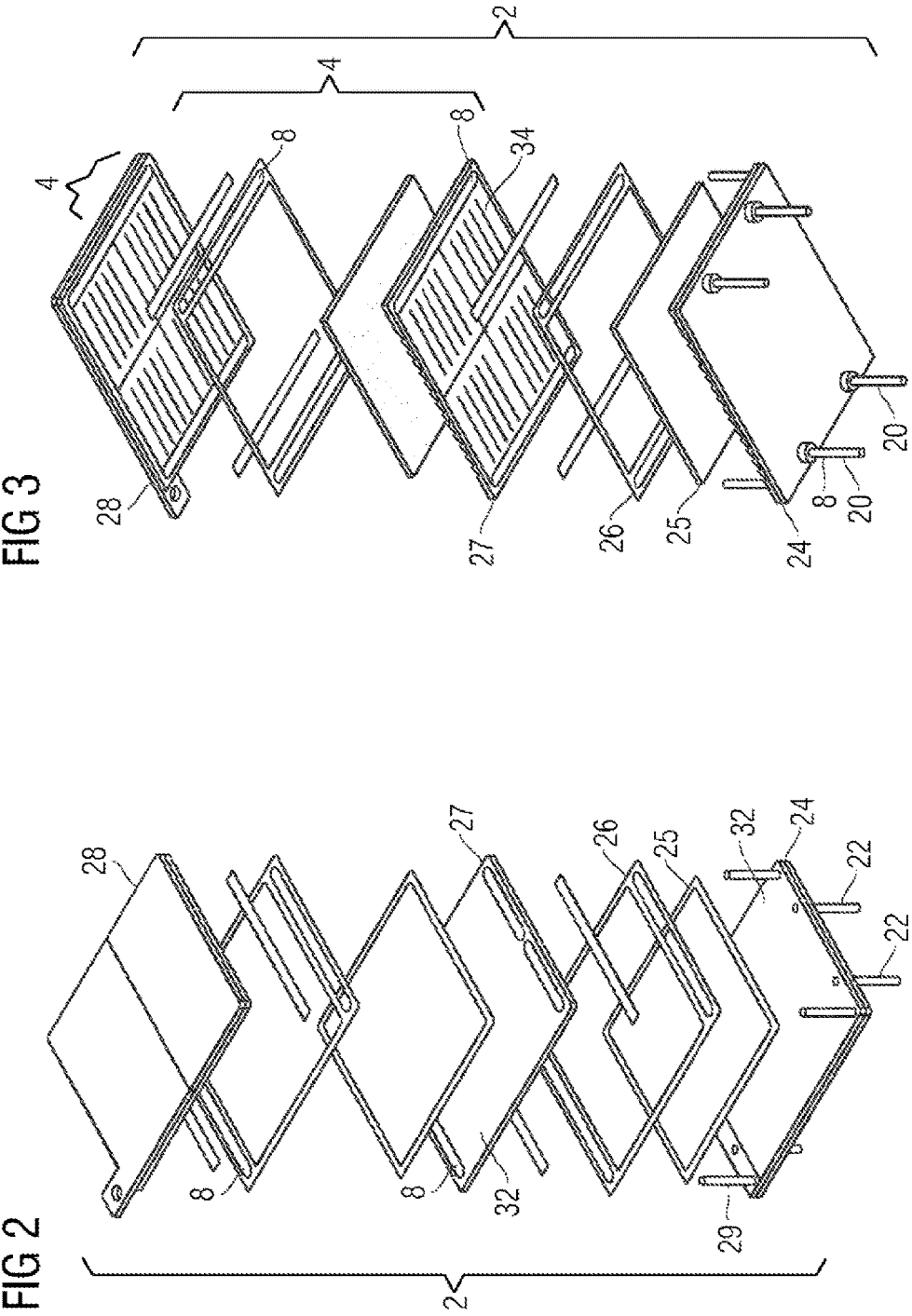

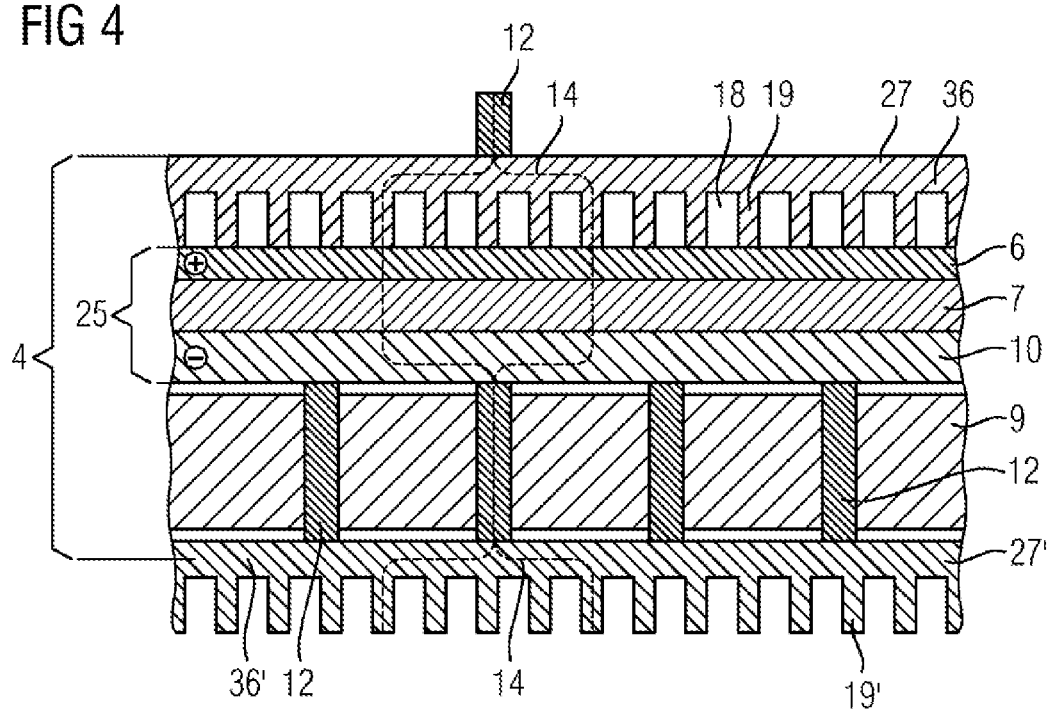
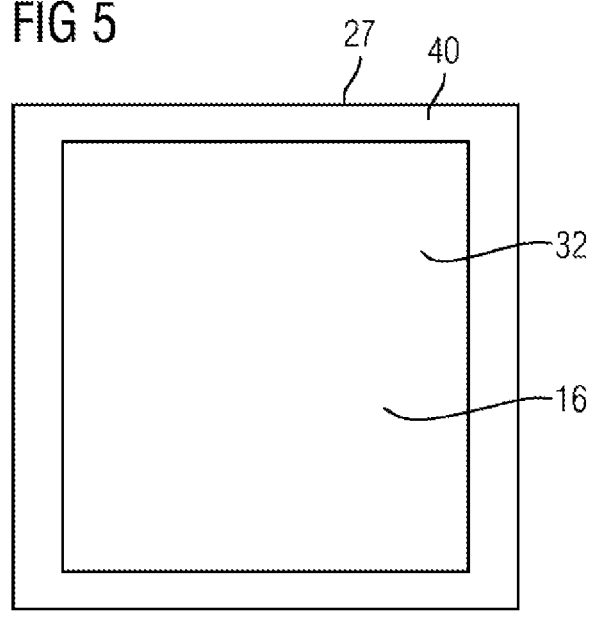
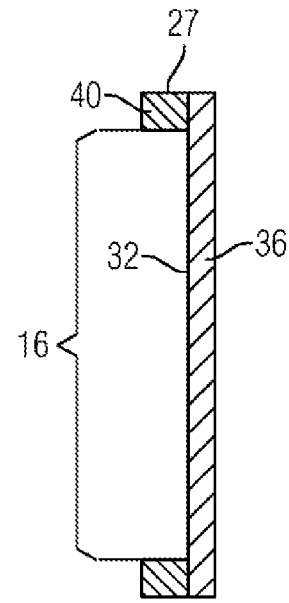

ELECTRICAL ENERGY STORE

CROSS REFERENCE TO RELATED APPLICATIONS

This application is the US National Stage of International Application No. PCT/EP2013/060645 filed May 23, 2013, and claims the benefit thereof. The International application claims the benefit of German Application No. DE 102012211325.8 filed Jun. 29, 2012. All of the applications are incorporated by reference herein in their entirety.

FIELD OF INVENTION

The invention relates to an electrical energy store.

BACKGROUND OF INVENTION

Various technical alternatives are used for storing excess electric current which accumulates, for example, during current generation by renewable energy sources or by power stations which are operated within the range of optimum efficiency, and for which there is temporarily no need on the grid. One of these alternatives is the rechargeable metal-air battery (rechargeable oxide battery, ROB). ROBs are generally operated at temperatures of between 600° C. and 900° C. In this case, oxygen which is supplied to a (positive) air electrode of the electrical cell is converted into oxygen ions, transported by a solid electrolyte and brought to the opposite negative electrode (discharge operation) or transported from the negative electrode via the solid electrolyte to the air side (charging operation). A reduction or oxidation reaction with a gaseous redox pair takes place at the negative electrode (depending on whether charging or discharging is taking place), wherein the oxygen which is absorbed or given off by the gaseous redox pair is transferred by diffusion by the components of the redox pair to a porous, i.e. gas-permeable and likewise oxidizable and reducible storage medium. Owing to the high temperatures required, for example, for the transport of oxygen in the ceramic electrolyte for this process, the material selection for the cell materials used and the design of the cell parts and the arrangement of the storage medium are very complex. In particular, the individual components suffer after several redox cycles which are operated at said operating temperatures. In addition, an increase in the storage density per storage cell or per volume unit of the energy store is always desired for efficient use.

SUMMARY OF INVENTION

An object of the invention therefore is in providing an electrical energy store on the basis of an ROB which has an improved storage density given a high mechanical stability in comparison with the prior art.

This object is achieved by an electrical energy store comprising a storage cell having the features of the claims. The electrical energy store according to the invention as claimed has a storage cell, which in turn comprises an air electrode, which is connected to air channels of an air inlet apparatus, and a storage electrode. In general, a solid electrolyte is arranged between the air electrode and the storage electrode. In turn, the storage electrode adjoins a storage structure, wherein electrical contacts rest on the storage electrode, wherein the storage structure is characterized by the fact that contact pins are integrated in said storage structure, said contact pins protruding out of a surface of the storage structure and being in electrical contact with the storage electrode.

The contact pins are therefore integrated directly in the storage structure. They are already introduced into said storage structure when said storage structure is produced. The contact pins protrude slightly out of the storage structure on the storage electrode side (advantageously by less than 5 mm), with the result that contact between the electrode and the contact pins is always ensured. Therefore, there is a small spacing between the storage electrode and the storage structure. This spacing between the storage electrode and storage structure can also be used, for example, for passing through a flushing gas or for regulating the concentration of a shuttle gas, which will be explained later.

In addition, it may be expedient to arrange an additional contact mesh between the contact pins and the storage electrode, through which contact mesh the electrons can flow away more effectively onto the contact pins.

The described electrical energy store comprising the storage cell and the storage structure has in particular the advantage that, by virtue of a comparatively small number of contact pins, the current path through the storage cell via the contact pins is ensured, wherein a maximum volume of the storage structure or of the active storage material is ensured. The energy density of the electrical energy store per volume unit of the energy store is increased by these measures. In addition, a storage structure with the integrated contact pins can be favorably mass-produced. As a result, the total costs of the electrical energy store with an increased energy density are also reduced.

It has been found that the diameter of the contact pins is advantageously between 2 mm and 7 mm, particularly advantageously between 2 mm and 4 mm. In this case, the cross section of the contact pins can assume various expedient geometries. Particularly expedient in this case is a circular cross section, but also an oval or rectangular or polygonal cross section. The cross section of the contact pins is particularly relevant for the production of the contact pins per se and of the cutout in the storage structure.

The spacing between the contact pins is in this case advantageously between 10 mm and 30 mm, particularly advantageously between 17 mm and 21 mm. This spacing between the contact pins is small enough for the electrons to flow away undisrupted via the contacts, but at the same time is large enough to provide as much volume as possible for the storage structure.

In addition, it is expedient to construct the electrical energy store from a plurality of different storage cells which are combined together in a stack. In this case, it is expedient to use an interconnector plate, which contains air channels on an air side and a receiving depression on an opposite side, which is referred to as the storage side.

The current path in an energy store with a stack, which in turn has interconnector plates, in this case advantageously proceeds as follows: first, the current flows through a volume material of a first interconnector plate, then flows via contact webs between the air channels of the first interconnector plate on which the air electrode rests, and a further station is the solid electrolyte, followed by the storage electrode. From here, the electrons flow along the current path through the contact pins of the storage structure into a second interconnector plate and finally into the volume material of the second interconnector plate. Depending on how many stacks follow one another, the described current path is repeated a plurality of times until the electrons are passed out or passed in at outer electrodes.

In a further expedient configuration of the invention, the contact pins have rounded heads, which rest on the storage electrode. Such a rivet design can be expedient in order to reduce the mechanical pressure loading of the stacked structure or the pressure loading on the electrode structure, which substantially consists of a ceramic material. In addition, manufacturing-related tolerances of the storage structure or the further stack components can also be compensated for by this rounded-off head form. Furthermore, a metal mesh (for example consisting of nickel) located between the contact pins and the storage electrode helps to limit local pressure forces.

BRIEF DESCRIPTION OF THE DRAWINGS

Further features and further advantageous configurations of the invention are explained in more detail with reference to the following figures. These are merely exemplary configurations which do not restrict the scope of protection in any way.

In the figures:

FIG. 2 shows an exploded illustration of a stack, viewed from above, FIG. 3 shows an exploded illustration of the stack shown in FIG. 2, viewed from below, FIG. 4 shows a cross section through a storage cell with current path, FIG. 5 shows a plan view of an interconnector plate, on the storage side thereof, FIG. 6 shows a cross section through the interconnector plate shown in FIG. 5.

DETAILED DESCRIPTION OF INVENTION

Figure 1:
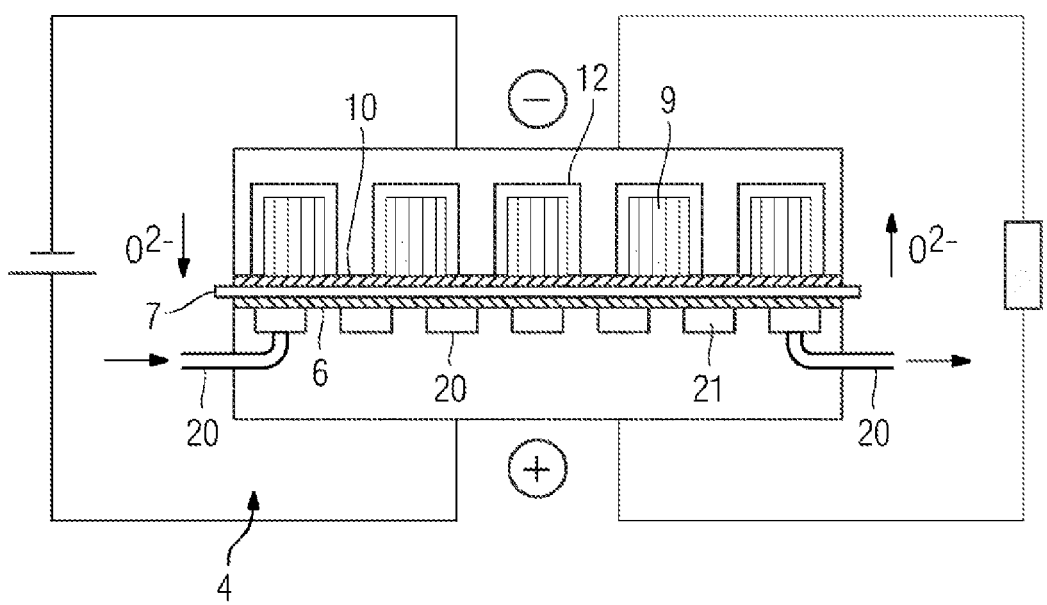
FIG. 1 shows a schematic illustration of a cell of a rechargeable oxide battery.

First, the mode of operation of a rechargeable oxide battery (ROB) will be described schematically with reference to FIG. 1, insofar as this is necessary for the present description of the invention. A conventional design of an ROB comprises a process gas, in particular air, which is blown in via a gas supply 20 at a positive electrode 6, which is also referred to as air electrode, wherein oxygen is taken from the air during discharge (circuit on the right-hand side of the figure). The oxygen passes in the form of oxygen ions $O^{2-}$ through a solid electrolyte 7, which rests on the positive electrode 6, to a negative electrode 10. Said negative electrode is connected to the porous storage medium in the channel structure via a gaseous redox pair, for example a hydrogen/steam mix. If a dense layer of the active storage material were to be present at the negative electrode 10, the charging capacity of the battery would be exhausted quickly.

For this reason, it is expedient to use a storage structure 9 comprising porous material which contains a functionally effective oxidizable material as an active storage material, advantageously in the form of iron and/or iron oxide, at the negative electrode 10 as energy storage medium.

The oxygen ions transported by the solid electrolyte 7 after discharge of said oxygen ions at the negative electrode are transported in the form of steam through pore channels in the porous storage structure 9, which comprises the active storage material, via a redox pair which is gaseous during the operating state of the battery, for example $H_2/H_2O$. Depending on whether a discharge or charging operation is present, the metal or metal oxide (iron/iron oxide) is oxidized or reduced and the oxygen required for this is supplied by the gaseous redox pair $H_2/H_2O$ or transported back to the solid electrolyte. This mechanism of the oxygen transport via a redox pair is referred to as shuttle mechanism.

The advantage of the iron as oxidizable material, i.e. as active storage material in the storage structure 9, arises in that it has approximately the same open-circuit voltage of approximately 1 V during its oxidization process as the redox pair $H_2/H_2O$ with a partial pressure ratio of 1; otherwise there is an increased resistance to the transport of oxygen through the diffusing components of this redox pair.

The diffusion of the oxygen ions through the solid electrolyte 7 requires a high operating temperature of 600 to 900° C. of the described ROB, but also this temperature range is advantageous for the optimum composition of the redox pair $H_2/H_2O$ in equilibrium with the storage material. In this case, not only the structure of the electrodes 6 and 10 and of the electrolyte 7 is subject to high thermal loading, but also the storage structure 9, which comprises the active storage material.

One advantage of the ROB arises in that it can be extended in modular fashion virtually to an unlimited extent by its smallest unit, namely the storage cell. Therefore, a small battery for fixed domestic use can likewise be an industrial-scale installation for the storage of the energy of a power station.

A plurality of storage cells 4 described in FIG. 1 are combined to form a so-called stack 2. The structure of a stack 2 and the arrangement of the storage cells 4 in the stack 2 is illustrated using the exploded illustrations in FIG. 2 and FIG. 3. FIG. 2 shows the structure of a stack which is considered from above and in this case is assembled in order from bottom to top. The stack 2 initially comprises a base plate 24, which is assembled, if appropriate, from a plurality of individual plates, which in turn have functional structuring and depressions, for example for air guidance. This assembly of individual plates, which is not described in any more detail here, to form the base plate 24 is performed by means of a hard soldering method, for example.

The base plate 24 has an air inlet 20 and an air outlet 22. As already described, channels for the supply of air (not shown here) are integrated in the base plate 24 by virtue of the assembly of the individual plates. In addition, the base plate 24 has centering bolts 29, by means of which further components of the stack 2 can now be applied in centered fashion. The next layer which follows is an electrode/electrolyte unit 25, which comprises in particular the above-described positive electrode 6, the solid electrolyte 7 and the storage electrode 10. This is a self-supporting ceramic structure, onto which the individual functional regions such as the electrodes or the solid electrolyte are applied using a thin-film or thick-film method.

A further layer which follows is a seal 26, which comprises, for example, a glass frit, which fuses slightly above the operating temperature and which seals off the individual plates of the stack 2 at the operating temperatures of the battery. The next plate which follows is a so-called interconnector plate 27, which has two functionally acting sides. The air supply channels (air channels 18) illustrated, which adjoin the positive electrode 6 of a storage cell 4, are located on the lower side 34 (shown in FIG. 3) of said interconnector plate 27. The interconnector plate 27 has contact pins 12 (not illustrated in any more detail in FIG. 2), which pass through the storage structure 9 or are introduced into said storage structure 9, on the upper side (storage side 32). The upper side of the interconnector plate 27 in FIG. 2 has the same structure as the upper side of the base plate 24. Here too, the contact pins 12 are intended to be introduced into the storage medium 9. This side with the contact pins 12 in each case faces the storage electrode 10 of the storage cell 4.

By way of example, a further plane of the sequence of electrode/electrolyte unit 25, seal 26 beneath a terminating plate 28 to form the entire structure of the stack 2 is illustrated in FIG. 2. In principle, a series of further planes of these component parts can of course follow, with the result that a stack generally has ten or more layers of storage cells 4.

FIG. 3 shows the same stack 2, which is described in FIG. 2, with the reverse viewing direction. FIG. 3 shows a view onto the base plate 24 from below; the electrode/electrolyte unit 25 and the seal 26 again follow. The interconnector plate 27 is now likewise visible from below, wherein in this case the view is directed onto the air side 34, which faces the air electrode (air side 34). In this example, four separate regions on the air side 34 are illustrated on the interconnector plate, said regions corresponding to a subdivision into four individual storage cells per stack plane (wherein this subdivision into four storage cells can be considered to be purely by way of example). The storage cell 4 in this example therefore comprises a quarter of the area of the respective interconnector plate 27 or the base plate 24 or the cover plate 28. In addition, the respective cell 4 is formed by a sequence of the respective air side 34, seal 26, electrode/electrolyte unit 25 and again in each case a quarter of the storage side 32 of the base plate 24 or of the interconnector plate 27. The air side 34 is in this case supplied with the process gas air by a stack-internal air distribution apparatus (also referred to as manifold) which is not illustrated in any more detail, which surrounds a plurality of planes of the stack.

The supply of the gaseous redox pair to the storage side in this example takes place by virtue of the fact that the storage sides of the interconnector plates are open towards the surrounding environment and the stack is in a container which is filled with steam/hydrogen mix.

FIG. 4 shows a cross section through a storage cell 4, which also illustrates a current path 14 of the current flowing through the stack, by way of example by means of the dashed line 14. The cell 4 in this case begins, when viewed from the top to the bottom, with an interconnector plate 27, which has contact webs 19 on its air side, by means of which contact webs in turn the air channels 18 are formed. The electrode/electrolyte unit 25, which comprises the positive electrode (air electrode 6), the solid electrolyte 7 and the negative electrode, referred to as storage electrode 10, rests on the surfaces of the contact webs 19. In turn, contact pins 12 rest on the storage electrode 10, by means of which contact pins the current is guided away and passed onto the volume material 36 of the interconnector plate 27.

FIG. 5 illustrates a plan view of an interconnector plate 27, wherein the view is of the storage side. In this case, a receiving depression 16 which has a rectangular configuration (by way of example here) is shown, which receiving depression is used for receiving a storage structure 9 (yet to be renewed). The receiving depression 16 is bordered by a rim 40 on the interconnector plate.

Figure 7:
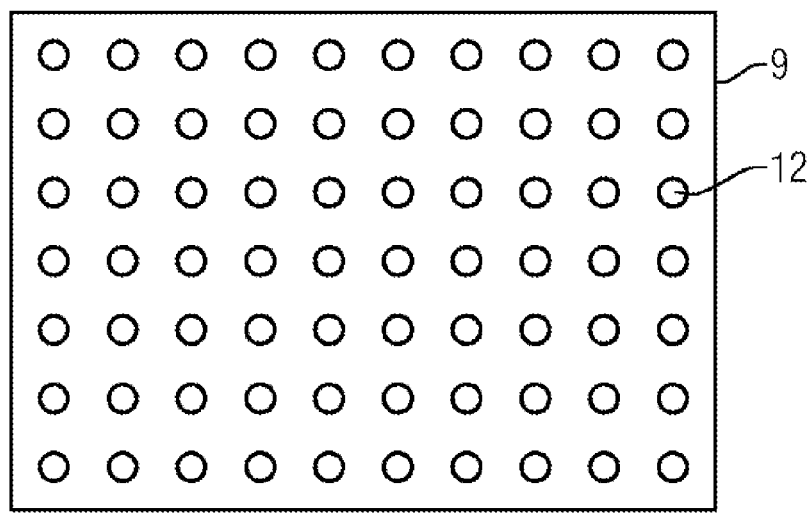
FIG. 7 shows a plan view of a storage structure with integrated contact pins.
Figure 8:
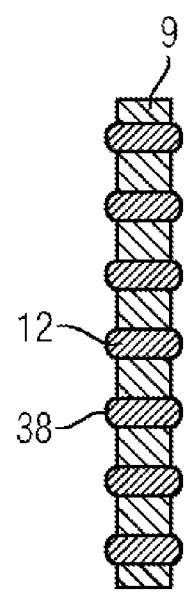
FIG. 8 shows a cross section through the storage structure shown in FIG. 7.

FIG. 7 shows the storage structure 9 which is inserted into the receiving depression 16 of the interconnector plate 27. The contact pins 12 in this configuration are introduced into the storage structure 9 at regular spacings. In this case, heads 38 of the contact pins 12 protrude out of the two surfaces of the storage structure 9. These heads 38 are firstly connected to the interconnector plate 27 and on the opposite side the heads 38 are connected to the storage electrode 10. The rounded-off portions of the heads 38, which form the actual contact area, serve the purpose of diminishing mechanical stresses and pressures on the individual components, in particular the electrode/electrolyte unit 25. The structure of the heads 38 is shown in particular in FIG. 8.

The integration of the contact pins 12 in the storage structure 9 has the advantage that a different material can be selected for the contact pins 12 than for the interconnector plate. Mechanically loadable, relatively high-melting metals such as nickel, chromium, nickel-based or chromium-based alloys and high-alloy steels (FeCr22) have proven useful as material for the contact pins. These metals are relatively inexpensive and good electrical conductors. For mechanical and manufacturing-related reasons, however, a different material, which may be easier to machine or be optimized in terms of the mechanical and thermal properties, can be used for the interconnector plate 27.

The manufacture of the storage structure 9 can be performed by means of a conventional ceramic pressing process (cold isostatic, hot isostatic, uniaxial) or via a film casting process or via a lamination process. Then, still in the green state or after thermal treatment with a incipient sintering process, the cutouts for the contact pins can be introduced by means of drilling, punching, erosion, milling, laser beam cutting, water jet cutting or particle beam cutting. Likewise, the storage structure can also be produced close to the end contour, for example by means of an extrusion process or a ceramic injection-molding process.

The contact pins 12 can then be used as rod material in the cutouts of the storage structure. Advantageously, the contact pins, as already mentioned, are rounded off slightly in the head region at one or both ends in order to minimize the later mechanical pressure loading of the covering structure and in the process to be able to form a larger contact area.

In an alternative configuration, the contact pins can also be produced by filling the cutouts in the storage structure 9 with molten metal or with a metal powder using a subsequent sintering process. The rim 40 of the interconnector plate 27 which borders the receiving depression 16 and is set to the stringent requirements in respect of tolerances, since it needs to seal off the storage structure with respect to the air circuit, can be structured, for example, by reaming or electrochemical etching or erosion of the interconnector plate on the storage side. In principle, the interconnector plate 27 can also already be produced close to the end contour, for example by means of a powder-metallurgical production process or by a precision casting process, however. Another possibility for producing the rim 40 is welding the rim 40 onto a plane in the interconnector plate 27.

It has proven to be expedient that the diameter of the contact pins is between 2 mm and 7 mm, advantageously between 2 mm and 4 mm. In addition, the spacing between the contact pins should be between 10 mm and 30 mm. Advantageously, the spacing should be between 17 mm and 21 mm. The arrangement of the contact pins 12 in this case does not necessarily need to be performed in regular Cartesian form, as is illustrated by way of example in FIG. 5. Other arrangement patterns may also be expedient here.

The spacing between and diameter of the contact pins 12 result substantially from the resistivities which are encountered in the cell 4 along the current path 14 on the storage side. By virtue of the contact-making, a critical resistance $R_{crit}$ should not be exceeded, and this critical resistance can be set as being equal to 10% of the resistance of the electrode/electrolyte unit 25 with ideal contact, for example. The resistance contribution of the contact comprises four components:

1. The effective resistance contribution caused by the passage of current through the interface between the interconnector plate and the contact pin:

$$R_1 = R_{K1} \cdot (L/D)^2$$

where
$R_{K1}$ is the characteristic resistance of this contact related to the actual contact area
D is the diameter of the contact area
L is the diameter of the electrode region which is supplied by this contact.

2. The effective resistance contribution caused by the passage of current through the interface between the contact pin and the storage electrode or the contact mesh positioned thereon:

$$R_2 = R_{K2} \cdot (L/D)^2$$

where $R_{K2}$ has the same meaning as in 1. and the plausible assumption has been made that the contact geometry is comparable to 1.

3. The effective resistance contribution caused by the voltage drop along the contact pin:

$$R_3 = \rho_P h (L/D)^2$$

where
$\rho_P$ is the resistivity of the pin material,
h is the length of the pin.

4. The effective resistance of the current constriction in the storage electrode or the storage electrode additionally covered by the contact mesh:

$$R_4 = \gamma R L^2$$

where $$\gamma \approx \frac{1}{4}[ln(L/D) - \frac{3}{4} + (D/L)^2(ln(L/D) + \frac{1}{4})]$$

R is the effective bulk resistance of the storage electrode which is provided by p/d when the contact mesh only rests on the contact-pressure areas of the contact pins, where
ρ is the electronic resistivity of the storage electrode
d is the thickness of the storage electrode.

Limit values for the rating of L, D and h then result from the fact that each of the partial resistances remains lower than the critical resistance:
$R_1 < R_{crit}$,
$R_2 < R_{crit}$,
$R_3 < R_{crit}$,
$R_4 < R_{crit}$.

The invention claimed is:

1. An electrical energy store comprising:
a storage cell, which in turn comprises an air electrode, which is connected to air channels of an air inlet apparatus, and
a storage electrode, wherein the storage electrode adjoins a storage structure comprising a porous energy storage medium comprising a functionally effective oxidizable material as an active storage material, wherein electrical contacts rest on the storage electrode,
wherein contact pins are integrated in the storage structure, said contact pins protruding out of a surface of the storage structure and being in electrical contact with the storage electrode, and
wherein the functionally effective oxidizable material comprises at least one of iron and iron oxide.

2. The energy store as claimed in claim 1, further comprising
an interconnector plate, wherein the air channels are arranged on an air side of the interconnector plate, and a receiving depression for the storage structure is arranged on a storage side of the interconnector plate.

3. The energy store as claimed in claim 2, wherein a current path is defined through the energy store by:
a volume material of a first interconnector plate making contact with
contact webs between the air channels of the first interconnector plate which, in turn, make contact with
the air electrode which, in turn, makes contact with
a solid electrolyte which, in turn, makes contact with
the storage electrode which, in turn, makes contact with
the contact pins of the storage structure which, in turn, make contact with
the volume material of a second interconnector plate.

4. The energy store as claimed in claim 1, wherein a diameter of the contact pins is between 2 mm and 7 mm.

5. The energy store as claimed in claim 1, wherein the contact pins have a spacing of between 10 mm and 30 mm.

6. The energy store as claimed in claim 1, wherein the contact pins have rounded heads.

7. The energy store as claimed in claim 1, wherein a diameter of the contact pins is between 2 mm and 4 mm.

8. The energy store as claimed in claim 1, wherein the contact pins have a spacing of between 17 mm and 21 mm.

9. An electrical energy store comprising:
an electrode/electrolyte unit comprising an air electrode, a solid electrolyte and a storage electrode;
a storage structure comprising an active storage material;
a plurality of contact pins extending through a thickness of the storage material, a first end of the contact pins extending beyond the thickness of the storage material to make contact with the storage electrode;
an interconnector plate comprising an upper side in contact with a second end of the contact pins extending beyond the thickness of the storage material; and
contact webs formed on a lower side of the interconnector plate and defining air channels there between.

10. The energy store as claimed in claim 9, wherein a critical resistance is defined as being equal to 10% of a resistance of the electrode/electrolyte unit calculated assuming ideal contact between the air electrode/solid electrolyte and between the solid electrolyte/storage electrode, and spacing between and diameter of the contact pins is selected such that an effective resistance contribution caused by a passage of current through an interface between the interconnector plate and the contact pins is less than the critical resistance.

11. The energy store as claimed in claim 9, wherein a critical resistance is defined as being equal to 10% of a resistance of the electrode/electrolyte unit calculated assuming ideal contact between the air electrode/solid electrolyte and between the solid electrolyte/storage electrode, and spacing between and diameter of the contact pins is selected such that an effective resistance contribution caused by a passage of current through an interface between the contact pins and the storage electrode is less than the critical resistance.

12. The energy store as claimed in claim 9, wherein a critical resistance is defined as being equal to 10% of a resistance of the electrode/electrolyte unit calculated assuming ideal contact between the air electrode/solid electrolyte and between the solid electrolyte/storage electrode, and spacing between and diameter of the contact pins is selected such that an effective resistance contribution caused by a voltage drop along the contact pins is less than the critical resistance.

13. The energy store as claimed in claim 9, wherein a critical resistance is defined as being equal to 10% of a resistance of the electrode/electrolyte unit calculated assuming ideal contact between the air electrode/solid electrolyte and between the solid electrolyte/storage electrode, and an effective resistance of a current constriction in the storage electrode is less than the critical resistance.

14. The energy store as claimed in claim 9, wherein a material of construction of the contact pins is different than a material of construction of the interconnector plate.

15. The energy store as claimed in claim 9, wherein the contact pins comprise a sintered metal powder.

16. The energy store as claimed in claim 9, wherein the upper side of the interconnector plate comprises a rim defining a depression receiving the storage structure therein.

17. The energy store as claimed in claim 9, wherein the active storage material comprises at least one of iron and iron oxide.

18. An electrical energy store comprising:
- an electrode/electrolyte unit comprising an air electrode, a solid electrolyte and a storage electrode;
- an interconnector plate comprising contact webs defining air channels in contact with the air electrode;
- a storage structure comprising an active storage material; and
- a plurality of contact pins extending through a thickness of the storage structure, an end of each contact pin extending beyond the thickness of the storage structure to make contact with the storage electrode.

19. The energy store as claimed in claim 18, wherein the active storage material comprises at least one of iron and iron oxide.

* * * * *